United States Patent [19]

Semenenko

[11] Patent Number: 5,651,472
[45] Date of Patent: Jul. 29, 1997

[54] CLAMPING MECHANISM FOR CLAMPING CLOSURE MEMBER OF A FLOWABLE MATERIAL CONTAINER AND MATERIAL HANDLING SYSTEM HAVING SUCH A CLAMPING MECHANISM

[76] Inventor: Ivan Semenenko, Harvey House, High Street, Moreton-In-Marsh, Glos., United Kingdom

[21] Appl. No.: 312,987

[22] Filed: Oct. 3, 1994

[51] Int. Cl.⁶ .................................................. B65D 45/28
[52] U.S. Cl. .......................... 220/323; 220/324; 220/315; 222/564; 292/13; 292/80; 414/292
[58] Field of Search .................................. 220/233, 234, 220/628, 315; 292/13, 20, 80; 222/564; 414/292, 303

[56] References Cited

U.S. PATENT DOCUMENTS

| | | | |
|---|---|---|---|
| 1,059,424 | 4/1913 | Zwermann | 292/80 X |
| 2,503,222 | 4/1950 | Simons | 292/80 X |
| 2,667,858 | 2/1954 | Cussotti | 220/315 X |
| 2,763,386 | 9/1956 | Linde | 414/303 |
| 3,091,369 | 5/1963 | Sackett, Sr. | 222/564 X |
| 3,261,627 | 7/1966 | Wallden | 220/315 X |

FOREIGN PATENT DOCUMENTS

| | | | |
|---|---|---|---|
| 1903032 | 8/1970 | Germany | 414/292 |
| 423739 | 1/1992 | Japan . | |
| 635 800 | 4/1983 | Switzerland . | |
| 1678729 | 9/1991 | U.S.S.R. | 414/292 |
| 705186 | 3/1954 | United Kingdom . | |
| 2 187 438 | 9/1987 | United Kingdom . | |
| 2 212 788 | 8/1989 | United Kingdom . | |

*Primary Examiner*—Allan N. Shoap
*Assistant Examiner*—Robin A. Hylton
*Attorney, Agent, or Firm*—Shapiro and Shapiro

[57] ABSTRACT

The invention relates to a clamping mechanism for clamping together a closure and a body mounting same, comprising a first member mounting a plurality of clamping devices, and a second member having an over-center part. The first and second members are in engagement, the arrangement being such that when the body engages the first member, the first and second members move over-center and the clamping devices and the second member engage the closure to clamp the closure in the body.

41 Claims, 2 Drawing Sheets

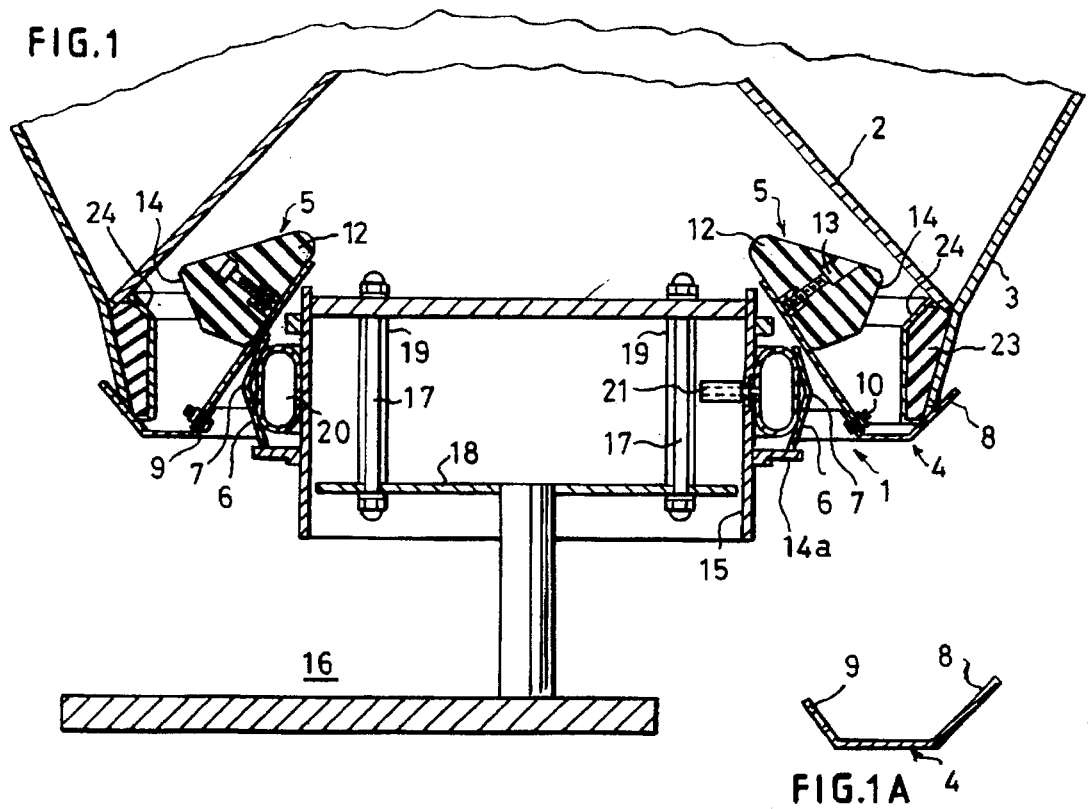
FIG.1
FIG.1A
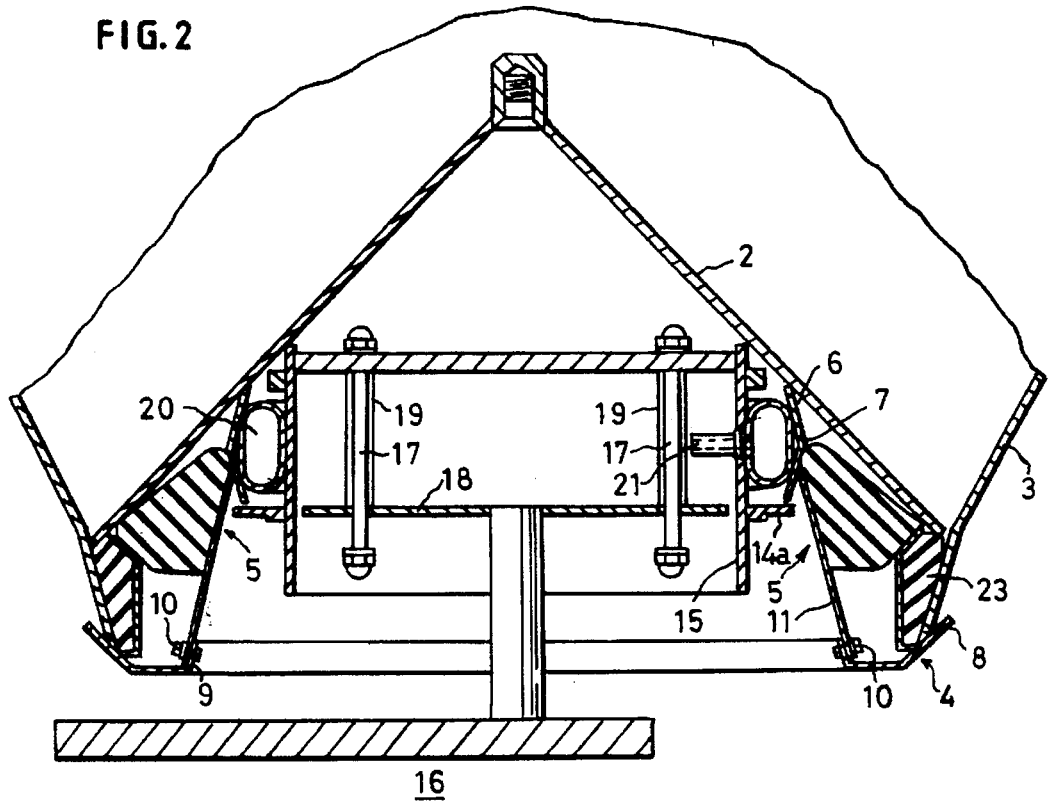
FIG.2

CLAMPING MECHANISM FOR CLAMPING CLOSURE MEMBER OF A FLOWABLE MATERIAL CONTAINER AND MATERIAL HANDLING SYSTEM HAVING SUCH A CLAMPING MECHANISM

BACKGROUND OF THE INVENTION

The invention relates to a clamping mechanism, particularly to such a mechanism as can be used for clamping a closure such as a cone seal in an aperture of a container, hopper, silo, or intermediate bulk container (I.B.C.), etc. which is used to store and/or transport, or mix, flowable material such as powder, granulated material or the like.

For various reasons, such as the need to contain the material so that it does not cross-contaminate with materials or to ensure that it does not escape to the ambient atmosphere with possibly detrimental environmental consequences, it is necessary to try to ensure as good a seal of the cone seal as possible. However, it has generally proved difficult to ensure that the cone does not become dislodged or tilted, or leak, during transport or use, particularly as it has to be borne in mind that the I.B.C. can carry as much as two tons or more of material. In a blender operation, the container is rotated end, over end and the cone can have an extremely high instantaneous component of lateral force on it when it is in a momentarily horizontal position, and this tends to dislodge the cone or cause it to leak.

SUMMARY OF THE INVENTION

It is an object of the invention to obviate the aforementioned disadvantages.

According to the invention there is provided a clamping mechanism for clamping together a closure and a body mounting same, comprising a first member mounting a plurality of clamping devices, and a second member having an over-center part, the first and second members being in engagement, the arrangement being such that when the body engages the first member, the first and second members move over-center and the clamping devices and the second member engage the closure to clamp the closure in the body.

The first member may comprise a means to receive the body and a mount for the clamping devices. This provides for automatic operation.

The means may comprise an annular dish-like member mounting the clamping devices. This is a relatively simple construction.

The dish-like member may have a flared periphery for engagement by the body.

The clamping devices may be secured to an inner boundary surface of the dish-like member by resilient mounting means. This provides for a positive clamping action.

The resilient mounting means may each comprise a leaf spring. This is a relatively simple yet inexpensive construction.

The clamping devices may each comprise a resilient member, such as a rubber block. This again is a relatively inexpensive construction.

Each rubber block may have an inclined surface for sealing engagement with an inclined surface of the body and closure. This again provides positive clamping action.

The inclined surfaces may each be inclined at about 45° to the horizontal. This is a particularly effective construction.

There may be three clamping devices on the dish-like member. This is an effective arrangement, particularly as the clamping devices may be equiangularly mounted on the dish-like member.

The second member may comprise an annular member of V-cross-section. This provides a simple yet effective over-center part.

There may be a means to hold the first and second member in engagement in a first operative position.

There may be holding means which may comprise an inflatable ring located in the 'V'. This provides a positive seating for the inflatable ring.

There may be means to disengage the second member from engagement with the closure in the clamped operative position, particularly a suction means. This is an alternative construction for use where the inflatable ring is dispensed with, and where the suction means may comprise a vacuum means.

According to a second aspect of the invention there is provided a materials handling system, having a location station for receiving apparatus which can contain a flowable material, the location station comprising a mechanism as hereinbefore defined.

According to a third aspect of the invention there is provided apparatus including a closure comprising a valve system having a conical closure, and a mechanism as hereinbefore defined, for clamping the conical valve in an aperture of the system.

The apparatus may comprise an intermediate bulk container.

A clamping mechanism and a system incorporating same, embodying the invention, are hereinafter described, by way of example, with reference to the accompanying drawings.

BRIEF DESCRIPTION OF THE DRAWINGS

FIG. 1 shows a schematic vertical cross-sectional view of a clamping mechanism according to the invention at a location station used in an I.B.C. container materials handling system;

FIG. 1A is a section of part of FIG. 1;

FIG. 2 is a view similar to FIG. 1 in a clamping operation; and

DESCRIPTION OF THE PREFERRED EMBODIMENTS

Figure 3:
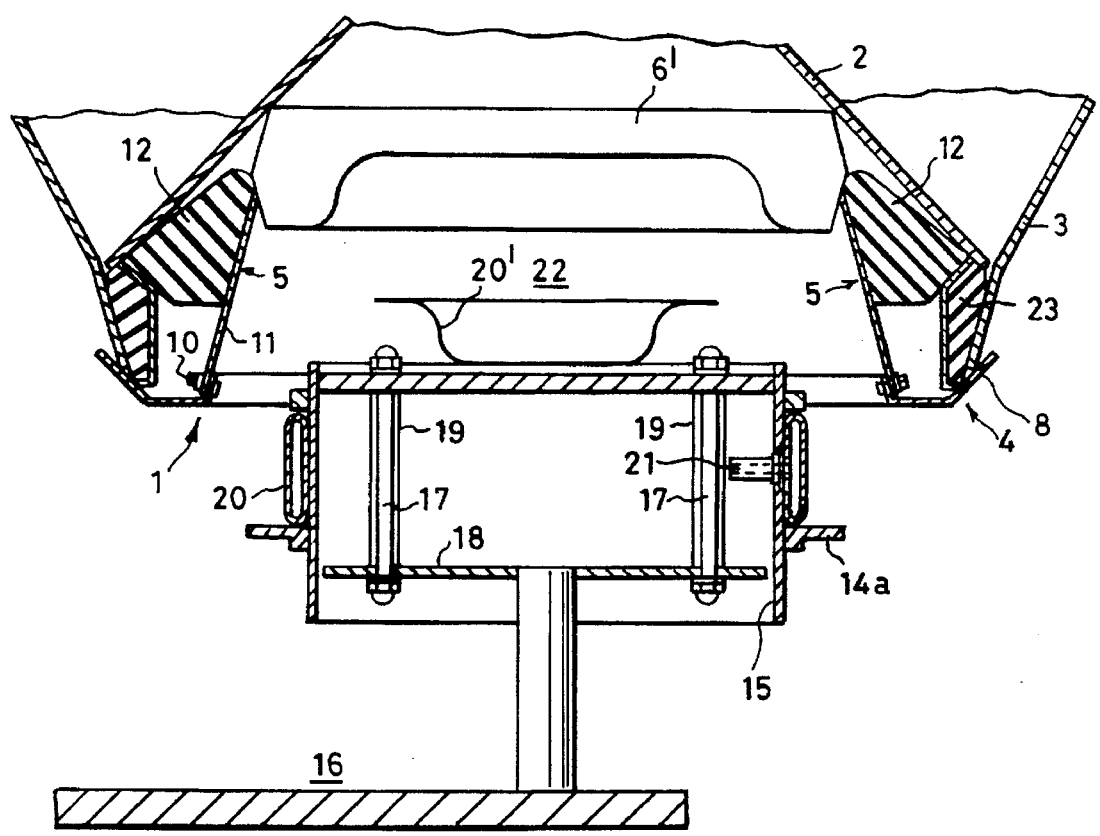
FIG. 3 is a view similar to FIG. 2 showing a fully clamped position.

Referring to the drawings, there is shown a clamping mechanism 1 for clamping together a closure (2) and a body (3) mounting same, comprising a first member (4) mounting a plurality of clamping devices (5) and a second member (6) having an over-center part (7), the first and second members (4,6) being in engagement, the arrangement being such that when the body (3) engages the first member (4), the first and second members (4,6) move over-center and the clamping devices (5) and the second member (6) engage the closure (2) whereby to clamp the closure (2) in the body (3).

The first member (4) comprises an annular dish-like member which, in the illustrative embodiment, is a rolled angle ring made of, for example, light steel. The outer (as viewed) periphery has a flared entry part (8), and the inner boundary surface (9) has secured to it, as by nuts and bolts (10), the plurality of the clamping devices (5). In the illustrative embodiment there are three of the clamping devices (5) which are spaced equiangularly around the first member (4) and secured by the nuts and bolts (10). Each clamping device (5) comprises a resilient mounting means in the form of a leaf spring (11), suitably of light duty. The leaf spring (11) supports at an end remote from the first member (4) a resilient member in the form of a rubber block (12) which is secured to the leaf spring (11) by a suitable means, such as a screw and block arrangement (13).

The rubber blocks (12) are each of generally triangular configuration, the base being of shallow 'V'-shape to provide an inclined surface (14), the angle of inclination being substantially 45° to the horizontal.

The second member (6) is in the form of an annular member of substantially 'V'-section, the apex of the 'V' forming the over-center part (7). The ring (6) seats in the first operative position on a beam or support-flange (14a), which is itself part of a central, in use, location frame (15) which is in turn part of a location station (16). The frame (15) has mounting posts (17) which pass through a base plate 18 and include springs (19), the clearance through the base plate (18) being a full clearance to provide a degree of lateral movement as well as movement in a substantially vertical sense. In this way, the frame (15) provides for inherent centering in use. Seated in the apex of the 'V' of the second member is retaining or holding means (20) for the second member, which is in the form of an inflatable ring, which can be inflated and deflated through a line (21). The second member (6) is captive in the positions shown in FIGS. 1 and 2, on the inflatable ring (20).

The clamping mechanism 1 is located on the central part of the location frame (15).

The mechanism is used to clamp the closure (2), which, in this case, is a conical cone valve, in an aperture (22) of a container such as an I.B.C., only part of the body (3) of which is shown. The body (3) of the I.B.C. defines the aperture (22), which is obturated and opened depending on the position of the closure (2). There is an annular seal (23) at the boundary of the aperture or opening (22), on which the closure (2) sits in the closed position. The seal (23) is resilient too, and it has an upper (as viewed) inclined surface (24) inclined at substantially 45°. The surfaces (14) and (24) are thus complementary.

To clamp the closure (2), the I.B.C. is lowered onto the location frame (15), being guided by a guide frame (not shown). At a certain height, the boundary surface of the body (3) of the I.B.C. defining the aperture (22) engages the flared perimeter (8) of the first member (4), and is located centrally. The lower part of the seal (23) of the I.B.C. and the surface (8) of the outer perimeter surface of the first member (4) engage in sealing relation and trap and seal any material which may be at the boundary so that it cannot escape. As the I.B.C. is lowered further, the first member (4) is drawn downwardly by the lowering force. This movement can only be accommodated by the leaf springs (11) pivoting outwardly so that they engage, with their surfaces (14), the respective complementary surfaces (24) of the seal (23). At the same time the springs (11) of necessity pass downwardly over the second member (6) and pass over-center over the over-center apex (7) of the 'V' of the second member (6). This causes a positive sealing engagement of the rubber blocks (12) and seal (23). On further lowering of the I.B.C., the inner surface of the closure (2) engages the upper (as viewed) edge of the second member (6), (FIG. 2). During all this movement, the inherent resilience provided by the rubber blocks (12), resilient seal (23), the springs (19), and the tensile strength of the leaf springs (11) ensure that any out of kilter arrangement between the I.B.C., its closure (2) and the location station (16) is automatically compensated for so that a true centering and mounting is achieved, (FIG. 2). The ring (20) may have been inflated during the lowering of the I.B.C. If so, it is now deflated, thereby releasing the second member (6), so the whole I.B.C. can be simply lifted off the location station 16 by any suitable means, (FIG. 3), the second member (6) simply being lifted off the flange (14a).

The closure (2) is now rigidly clamped in position, because the rubber blocks (12) are positively and solidly clamped between the second member 6 and the ring seal (23), thus creating a compressive force across the closure (2), through the second member 6, the rubber blocks (12) and the ring seal (23) to the body of the I.B.C. itself, thereby providing a totally tight, solid connection between the closure (2) and the mechanism (1), or transport cap, and this connection is virtually 100% fail-safe. The I.B.C. can then be transported, tumbled, moved, and handled however desired with no dislodgement of or leaking past the closure (2).

It will be understood that this whole clamping operation described above is automatically put into effect by the I.B.C. being lowered into the first member (4). This automatic action also creates a tension in the leaf springs (11) which thus clamps the closure (2) down into the aperture (22) (outlet) whilst also ensuring that the first ring seal (23) is forced up against the outlet. There may be a gasket (not shown) to seal any crevice between the closure and ring seal.

To disengage the mechanism (1), the operational sequence described is reversed. The (I.B.C.) is thus lowered onto the location frame (15) so that the second member (6) seats on the flange (14a) and the ring (20) is inflated (FIG. 1). The I.B.C. is then lifted, the leaf springs 11 pass up over the 'V'-over-center part (7) of the second member (6), and the leaf springs (11) then pivot automatically anti-clockwise, and the body (3) lifts off the first member (4), ready for another clamping sequence of operations.

It will be understood that in some applications, such as blending, a complete system may be an integral part of the blender, the IBC entering and leaving the blender without a transport cap. This arrangement gives cost savings where there are a number of IBC's to be used for blending in one blender.

Also, in a modification shown schematically in FIG. 3, the second member may be an inverted dish-like member (6') which may be removed from the closure in the position in FIG. 3 by suitable means such as suction means, for example, a vacuum suction grabber or gripper (20').

In every embodiment described there can be a great cost saving in that the closure, usually made of 6 mm stainless steel, can be reduced to a third or less of that gauge, and can even be made of plastic as there is no need to have a heavy closure, the weight of which has hitherto been used to hold it down in the I.B.C.

I claim:

1. A clamping mechanism, insertable into a discharge aperture of a container body that contains a flowable material, for clamping a closure member of the container body against the discharge aperture, the clamping mechanism comprising:

a first member having an inner opening and a portion for engagement with said container body;

a plurality of clamping devices disposed on said first member about said inner opening, said clamping devices being displaceable in a direction having at least a laterally outward component relative to said inner opening and disposed to be received in said discharge aperture; and a second member that is movable relative to said clamping devices, by engagement of said container body with said portion of said first member when said clamping mechanism is inserted into said discharge aperture, to force said clamping devices in the direction having at least a laterally outward component relative to said inner opening and into engagement with said closure member and thereby clamp said closure member against said discharge aperture.

2. A clamping mechanism according to claim 1, wherein said second member includes an over-center portion disposed to cooperate with said clamping devices such that, when said second member moves relative to said clamping devices to force said clamping devices in the direction having at least a laterally outward component relative to said inner opening, said clamping devices move over center of said over-center portion and are maintained in engagement with said closure member by said over-center portion.

3. A clamping mechanism according to claim 2, wherein said second member is trapped between said closure member and said clamping devices when said clamping devices move over center of said over-center portion.

4. A clamping mechanism according to claim 2, wherein said second member has a V-shaped outer surface.

5. A clamping mechanism according to claim 4, wherein said second member is annular and has a V-shaped cross section.

6. A clamping mechanism according to claim 4, wherein said second member is in the shape of an inverted dish.

7. A clamping mechanism according to claim 1, wherein said first member includes an annular member having a flared periphery that constitutes said portion for engagement with said container body.

8. A clamping mechanism according to claim 1, wherein said clamping devices are secured to said first member by respective resilient mounting devices.

9. A clamping mechanism according to claim 8, wherein said resilient mounting devices are secured to an inner boundary surface of said first member.

10. A clamping mechanism according to claim 8, wherein each of said resilient mounting devices includes a leaf spring.

11. A clamping mechanism according to claim 1, wherein said clamping devices include respective resilient clamping members.

12. A clamping mechanism according to claim 11, wherein each of said resilient clamping members includes a rubber block.

13. A clamping mechanism according to claim 11, wherein each of said resilient clamping members has first and second surfaces for engagement with said closure member.

14. A clamping mechanism according to claim 13, wherein said first and second surfaces are disposed at about 90° relative to each other.

15. A clamping mechanism according to claim 1, wherein three clamping devices are disposed on said first member.

16. A clamping mechanism according to claim 1, wherein said clamping devices are mounted equiangularly about said inner opening.

17. A material handling system, comprising:

a container body for containing a flowable material, said container body having a discharge aperture and a closure member for controlling flow of flowable material from said discharge aperture; and a clamping mechanism insertable into said discharge aperture for clamping said closure member against said discharge aperture, said clamping mechanism including a first member having an inner opening and a portion for engagement with said container body, a plurality of clamping devices disposed on said first member about said inner opening, said clamping devices being displaceable in a direction having at least a laterally outward component relative to said inner opening and disposed to be received in said discharge aperture, and a second member that is movable relative to said clamping devices, by engagement of said container body with said portion of said first member when said clamping mechanism is inserted into said discharge aperture, to force said clamping devices in the direction having at least a laterally outward component relative to said inner opening and into engagement with said closure member and thereby clamp said closure member against said discharge aperture.

18. A material handling system according to claim 17, wherein said second member includes an over-center portion disposed to cooperate with said clamping devices such that, when said second member moves relative to said clamping devices to force said clamping devices in the direction having at least a laterally outward component relative to said inner opening, said clamping devices move over center of said over-center portion and are maintained in engagement with said closure member by said over-center portion.

19. A material handling system according to claim 18, wherein said second member is trapped between said closure member and said clamping devices when said clamping devices move over center of said over-center portion.

20. A material handling system according to claim 18, wherein said second member has a V-shaped outer surface.

21. A material handling system according to claim 20, wherein said second member is annular and has a V-shaped cross section.

22. A material handling system according to claim 20, wherein said second member is in the shape of an inverted dish.

23. A material handling system according to claim 17, wherein said first member includes an annular member having a flared periphery that constitutes said portion for engagement with said container body.

24. A material handling system according to claim 17, wherein said clamping devices are secured to said first member by respective resilient mounting devices.

25. A material handling system according to claim 24, wherein said resilient mounting devices are secured to an inner boundary surface of said first member.

26. A material handling system according to claim 24, wherein each of said resilient mounting devices includes a leaf spring.

27. A material handling system according to claim 17, wherein said clamping devices include respective resilient clamping members.

28. A material handling system according to claim 27, wherein each of said resilient clamping members includes a rubber block.

29. A material handling system according to claim 27, wherein each of said resilient clamping members has first and second surfaces for engagement with said closure member.

30. A material handling system according to claim 29, wherein said first and second surfaces are disposed at about 90° relative to one another.

31. A material handling system according to claim 17, wherein three clamping devices are disposed on said first member.

32. A material handling system according to claim 17, wherein said clamping devices are mounted equiangularly about said inner opening.

33. A material handling system, comprising:
- a container body for containing a flowable material, said container body having a discharge aperture and a closure member for controlling flow of flowable material from said discharge aperture;
- a clamping mechanism insertable into said discharge aperture for clamping said closure member against said discharge aperture, said clamping mechanism including
  - a first member having an inner opening and a portion for engagement with said container body,
  - a plurality of clamping devices disposed on said first member about said inner opening, said clamping devices being displaceable in a direction having at least a laterally outward component relative to said inner opening and disposed to be received in said discharge aperture, and
  - a second member that is movable relative to said clamping devices, by engagement of said container body with said portion of said first member when said clamping mechanism is inserted into said discharge aperture, to force said clamping devices in the direction having at least a laterally outward component relative to said inner opening and into engagement with said closure member and thereby clamp
- said closure member against said discharge aperture; and
- a location station for receiving said container body, said location station including a location member to support said clamping mechanism for insertion into said aperture of said container body.

34. A material handling system according to claim 33, wherein said second member includes an over-center portion disposed to cooperate with said clamping devices such that, when said second member moves relative to said clamping devices to force said clamping devices in the direction having at least a laterally outward component relative to said opening, said clamping devices move over center of said over-center portion and are maintained in engagement with said closure member by said over-center portion.

35. A material handling system according to claim 34, wherein said second member is trapped between said closure member and said clamping devices when said clamping devices move over center of said over-center portion.

36. A material handling system according to claim 34, wherein said second member has a V-shaped outer surface.

37. A material handling system according to claim 34, further comprising means for holding said second member in a predetermined position on said location member.

38. A material handling system according to claim 37, wherein said second member is annular and has a V-shaped cross section, and said holding means includes an inflatable ring that can be inflated within said second member.

39. A material handling system according to claim 34, further comprising disengagement means cooperable with said second member to enable disengagement of said clamping devices from said closure member.

40. A material handling system according to claim 39, wherein said second member is annular and has a V-shaped cross section and said disengagement means includes an inflatable ring that can be inflated within said second member.

41. A material handling system according to claim 39, wherein said second member is in the shape of an inverted dish and said disengagement means includes suction means.

* * * * *